United States Patent
Kim et al.

(10) Patent No.: US 10,633,007 B1
(45) Date of Patent: Apr. 28, 2020

(54) AUTONOMOUS DRIVING ASSISTANCE GLASSES THAT ASSIST IN AUTONOMOUS DRIVING BY RECOGNIZING HUMANS' STATUS AND DRIVING ENVIRONMENT THROUGH IMAGE ANALYSIS BASED ON DEEP NEURAL NETWORK

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/721,963

(22) Filed: Dec. 20, 2019

Related U.S. Application Data

(60) Provisional application No. 62/799,086, filed on Jan. 31, 2019.

(51) Int. Cl.
*B60W 50/14* (2020.01)
*G02B 27/01* (2006.01)
(Continued)

(52) U.S. Cl.
CPC ......... *B60W 50/14* (2013.01); *G02B 27/0172* (2013.01); *G06K 9/00671* (2013.01);
(Continued)

(58) Field of Classification Search
CPC ............ B60W 50/14; B60W 2050/146; G06K 9/00671; G06T 7/10; G06T 7/74;
(Continued)

(56) References Cited

U.S. PATENT DOCUMENTS

| | | | | |
|---|---|---|---|---|
| 9,977,243 B2 * | 5/2018 | Jung | ....................... | G06F 3/013 |
| 2005/0046953 A1 * | 3/2005 | Repetto | ................ | G02B 27/017 |
| | | | | 359/630 |

(Continued)

*Primary Examiner* — Babar Sarwar
(74) *Attorney, Agent, or Firm* — Xsensus LLP

(57) ABSTRACT

A method for providing safe-driving information via eyeglasses of a driver of a vehicle is provided. The method includes steps of: a safe-driving information analyzing device, (a) if a visual-dependent driving image, corresponding to a perspective of the driver, from a camera on the eyeglasses, acceleration information and gyroscope information from sensors are acquired, inputting the visual-dependent driving image into a convolution network to generate a feature map, and inputting the feature map into a detection network, a segmentation network, and a recognition network, to allow the detection network to detect an object, the segmentation network to detect lanes, and the recognition network to detect driving environment, inputting the acceleration information and the gyroscope information into a recurrent network to generate status information on the driver and (b) notifying the driver of information on a probability of a collision, lane departure information, and the driving environment, and giving a warning.

21 Claims, 8 Drawing Sheets

(51) Int. Cl.
  *G06K 9/00*   (2006.01)
  *G06T 7/73*   (2017.01)
  *G06T 7/10*   (2017.01)
(52) U.S. Cl.
  CPC .................. *G06T 7/10* (2017.01); *G06T 7/74* (2017.01); *B60W 2050/146* (2013.01); *G02B 2027/014* (2013.01); *G02B 2027/0178* (2013.01); *G02B 2027/0187* (2013.01)
(58) Field of Classification Search
  CPC .......... G02B 27/0172; G02B 2027/014; G02B 2027/0187; G02B 2027/0178
  See application file for complete search history.
(56) References Cited

U.S. PATENT DOCUMENTS

| | | | | |
|---|---|---|---|---|
| 2014/0342790 | A1* | 11/2014 | Kim | A63F 13/5375 463/6 |
| 2015/0015479 | A1* | 1/2015 | Cho | G06F 3/013 345/156 |
| 2016/0041612 | A1* | 2/2016 | Spiessl | G06F 3/0346 345/156 |
| 2016/0041624 | A1* | 2/2016 | Spiessl | G06F 3/017 345/8 |
| 2016/0207539 | A1* | 7/2016 | Jung | G06F 3/013 |
| 2016/0212129 | A1* | 7/2016 | Johnston | G06F 21/73 |
| 2016/0214531 | A1* | 7/2016 | Bachorski | B60Q 9/00 |
| 2017/0108918 | A1* | 4/2017 | Boesen | G02B 27/0172 |
| 2017/0111723 | A1* | 4/2017 | Boesen | H04W 76/14 |
| 2017/0270489 | A1* | 9/2017 | Dornhausen | G06Q 10/20 |
| 2017/0329329 | A1* | 11/2017 | Kamhi | B60W 50/14 |
| 2018/0247138 | A1* | 8/2018 | Kang | B60W 50/14 |
| 2018/0329209 | A1* | 11/2018 | Nattukallingal | G06F 3/0304 |
| 2019/0098070 | A1* | 3/2019 | Kim | G06F 3/013 |
| 2019/0102636 | A1* | 4/2019 | Koravadi | G02B 27/017 |
| 2019/0197369 | A1* | 6/2019 | Law | G06K 9/66 |
| 2019/0258865 | A1* | 8/2019 | Ernesti | G06Q 50/265 |

\* cited by examiner

AUTONOMOUS DRIVING ASSISTANCE GLASSES THAT ASSIST IN AUTONOMOUS DRIVING BY RECOGNIZING HUMANS' STATUS AND DRIVING ENVIRONMENT THROUGH IMAGE ANALYSIS BASED ON DEEP NEURAL NETWORK

CROSS REFERENCE TO RELATED APPLICATION

This application claims the benefit of priority to U.S. Provisional Patent Application No. 62/799,086, filed on Jan. 31, 2019, the entire contents of which are incorporated herein by reference.

FIELD OF THE DISCLOSURE

The present disclosure relates to assistance glasses wearable by a driver; and more particularly, to the assistance glasses which provides safe-driving information by analyzing a visual-dependent driving image corresponding to a perspective of the driver acquired from a camera installed on the assistance glasses worn by the driver, based on deep learning.

BACKGROUND OF THE DISCLOSURE

Today's vehicles are combined with IT technology to provide various functions. In order to enhance a driving stability of a vehicle and to improve convenience of users, various types of advanced driver-assistance system (ADAS) are being developed.

Herein, the ADAS is implemented by using advanced sensing devices and intelligent imaging devices to provide various information for autonomous driving, and it includes a pedestrian & car recognition system, a road surface recognition system, a lane recognition system, a crash prevention system, a lane departure warning system, etc.

However, these conventional ADASs use many various sensors and cameras for recognizing a driving environment of the vehicle and a driver's status, resulting in increasing the cost.

Further, in the conventional ADASs, the sensors and the cameras should be installed at optimal positions for acquiring relevant information. But if errors in position and sensing direction occur, then accurate information cannot be obtained and, accordingly, the accurate information cannot be provided for assisting the driver.

SUMMARY OF THE DISCLOSURE

It is an object of the present disclosure to solve all the aforementioned problems.

It is another object of the present disclosure to detect at least one driving environment and at least one driver status with less cost than that of conventional methods.

It is still another object of the present disclosure to allow surrounding monitoring, driver monitoring, and hazardous situation recognition by a deep neural network using at least one driving image and sensor information.

It is still yet another object of the present disclosure to notify a driver of driver-assisting information acquired by the deep neural network using the driving image and the sensor information.

In accordance with one aspect of the present disclosure, there is provided a method for providing safe-driving information via assistance glasses worn by a driver, including steps of: (a) if at least one visual-dependent driving image corresponding to perspective of the driver taken from at least one camera installed on the assistance glasses worn by the driver of a vehicle, acceleration information and gyroscope information from one or more sensors installed on the assistance glasses are acquired, a safe-driving information analyzing device performing (i) a process of inputting the visual-dependent driving image into a convolution network, to thereby allow the convolution network to generate at least one feature map by applying convolution operation to the visual-dependent driving image, and a process of inputting the feature map respectively into a detection network, a segmentation network, and a recognition network, to thereby allow the detection network to detect at least one object located on the visual-dependent driving image by using the feature map, allow the segmentation network to detect one or more lanes on the visual-dependent driving image, and allow the recognition network to detect driving environment corresponding to the visual-dependent driving image, (ii) a process of inputting the acceleration information and the gyroscope information into a recurrent network, to thereby allow the recurrent network to generate status information on the driver corresponding to the acceleration information and the gyroscope information; and (b) the safe-driving information analyzing device performing (i) a process of notifying the driver of information on an estimated probability of a collision between the vehicle and the object via an output unit of the assistance glasses by referring to the object detected by the detection network, a process of notifying the driver of lane departure information on the vehicle via the output unit by referring to the lanes detected by the segmentation network, and a process of notifying the driver of the driving environment detected by the recognition network via the output unit, and (ii) a process of giving a safe-driving warning to the driver via the output unit by referring to the status information on the driver detected by the recurrent network.

As one example, the safe-driving information analyzing device performs a process of inputting the feature map into the detection network, to thereby allow the detection network to (i) generate proposal boxes, corresponding to one or more regions where the object is estimated as located, on the feature map by using a region proposal network, (ii) generate at least one object feature vector by applying pooling operation to each of one or more areas, corresponding to each of the proposal boxes, on the feature map via a pooling layer, and (iii) generate multiple pieces of object information corresponding to the proposal boxes by applying object-detecting fully-connected operation to the object feature vector via an object-detecting fully-connected layer, and as a result, a process of detecting the object located on the visual-dependent driving image.

As one example, the safe-driving information analyzing device performs a process of inputting the feature map into the segmentation network, to thereby allow the segmentation network to generate at least one deconvolutional feature map by applying deconvolution operation to the feature map via at least one deconvolutional layer, and a process of inputting the deconvolutional feature map into at least one lane-detecting fully-connected layer, to thereby allow the lane-detecting fully-connected layer to detect the lanes located on the visual-dependent driving image by applying lane-detecting fully-connected operation to the deconvolutional feature map.

As one example, the safe-driving information analyzing device performs a process of inputting the feature map into the recognition network, to thereby allow the recognition network to (i) generate at least one global feature vector by applying global-pooling operation to the feature map via a global-pooling layer, and (ii) generate driving environment information by applying recognition fully-connected operation to the global feature vector via a recognition fully-connected layer, and as a result, a process of detecting the driving environment corresponding to the visual-dependent driving image.

As one example, the safe-driving information analyzing device performs a process of inputting the acceleration information and the gyroscope information into the recurrent network, to thereby allow the recurrent network to generate the status information on the driver corresponding to behavioral patterns of the driver by applying recurrent operation to one or more change statuses of the acceleration information and the gyroscope information during a preset time period by using one or more Long Short Term Memories (LSTM).

As one example, the safe-driving information analyzing device performs a process of adjusting transparency of lenses of the assistance glasses in response to illumination information acquired from at least one illumination sensor installed on the assistance glasses.

As one example, the output unit includes (i) at least one speaker to be positioned at a location corresponding to at least one ear of the driver if the assistance glasses are worn by the driver and (ii) at least one Virtual Retinal Display (VRD) to be positioned at a location corresponding to at least one eye of the driver if the assistance glasses are worn by the driver.

As one example, the convolution network, the detection network, the segmentation network, and the recognition network have been learned by a 1-st learning device repeating (i) a process of inputting at least one visual-dependent driving image for training into the convolution network, to thereby allow the convolution network to generate at least one feature map for training by applying convolution operation using at least one previously learned convolution parameter to the visual-dependent driving image for training, (ii) (ii-1) a process of inputting the feature map for training into the detection network, to thereby allow (ii-1-1) a region proposal network of the detection network to generate one or more proposal boxes for training, corresponding to one or more regions where at least one object for training is estimated as located, on the feature map for training, (ii-1-2) a pooling layer of the detection network to generate at least one object feature vector for training by applying pooling operation to one or more regions, corresponding to each of the proposal boxes for training, on the feature map for training, and (ii-1-3) an object-detecting fully-connected layer of the detection network to generate multiple pieces of object information for training corresponding to the proposal boxes for training by applying object-detecting fully-connected operation using at least one previously learned object-detection parameter to the object feature vector for training, (ii-2) a process of inputting the feature map for training into the segmentation network, to thereby allow (ii-2-1) a deconvolutional layer of the segmentation network to generate at least one deconvolutional feature map by applying deconvolution operation using at least one previously learned deconvolution parameter to the feature map for training, and (ii-2-2) a lane-detecting fully-connected layer to detect one or more lanes for training located on the visual-dependent driving image for training by applying lane-detecting fully-connected operation using at least one previously learned lane-detection parameter to the deconvolutional feature map, (ii-3) a process of inputting the feature map for training into the recognition network, to thereby allow (ii-3-1) a global-pooling layer of the recognition network to generate at least one global feature vector for training by applying global-pooling operation to the feature map for training, and (ii-3-2) a recognition fully-connected layer of the recognition network to generate driving environment information for training by applying recognition fully-connected operation using at least one previously learned recognition parameter to the global feature vector for training, and (iii) (iii-1) a process of updating the previously learned object-detection parameter of the object-detecting fully-connected layer such that one or more 1-st losses are minimized which are outputted from a 1-st loss layer by referring to the multiple pieces of the object information for training and their corresponding 1-st ground truths, (iii-2) a process of updating at least one of the previously learned lane-detection parameter of the lane-detecting fully-connected layer and the previously learned deconvolution parameter of the deconvolutional layer such that one or more 2-nd losses are minimized which are outputted from a 2-nd loss layer by referring to the lanes for training and their corresponding 2-nd ground truths, (iii-3) a process of updating the previously learned recognition parameter of the recognition fully-connected layer such that one or more 3-rd losses are minimized which are outputted from a 3-rd loss layer by referring to the driving environment information for training and its corresponding 3-rd ground truth, and (iii-4) a process of updating the previously learned convolution parameter of the convolution network such that at least one 4-th loss is minimized which is created by weighted summation of the 1-st losses, the 2-nd losses, and the 3-rd losses or their processed values.

As one example, the recurrent network has been learned by a 2-nd learning device performing a process of inputting acceleration information for training and gyroscope information for training from a current point of time t to a previous point of time (t–k) into each of LSTMs, to thereby allow each of the LSTMs to output driving status information for training corresponding to behavioral patterns of the driver by applying forward operation to the acceleration information for training and the gyroscope information for training from the current point of time t to the previous point of time (t-k), and a process of instructing a 4-th loss layer to adjust one or more parameters of the LSTMs such that one or more 5-th losses are minimized which are created by referring to the driving status information for training and its corresponding 4-th ground truth.

In accordance with another aspect of the present disclosure, there is provided a safe-driving information analyzing device for providing safe-driving information via assistance glasses worn by a driver, including: at least one memory that stores instructions; and at least one processor configured to execute the instructions to perform or support another device to perform: (I) if at least one visual-dependent driving image corresponding to perspective of the driver taken from at least one camera installed on the assistance glasses worn by the driver of a vehicle, acceleration information and gyroscope information from one or more sensors installed on the assistance glasses are acquired, (I-1) a process of inputting the visual-dependent driving image into a convolution network, to thereby allow the convolution network to generate at least one feature map by applying convolution operation to the visual-dependent driving image, and a process of inputting the feature map respectively into a detection network, a segmentation network, and a recognition network, to thereby allow the detection network to detect at least one object located on the visual-dependent driving image by using the feature map, allow the segmentation network to detect one or more lanes on the visual-dependent driving image, and allow the recognition network to detect driving environment corresponding to the visual-dependent driving image, (I-2) a process of inputting the acceleration information and the gyroscope information into a recurrent network, to thereby allow the recurrent network to generate status information on the driver corresponding to the acceleration information and the gyroscope information, and (II) (II-1) a process of notifying the driver of information on an estimated probability of a collision between the vehicle and the object via an output unit of the assistance glasses by referring to the object detected by the detection network, a process of notifying the driver of lane departure information on the vehicle via the output unit by referring to the lanes detected by the segmentation network, and a process of notifying the driver of the driving environment detected by the recognition network via the output unit, and (II-2) a process of giving a safe-driving warning to the driver via the output unit by referring to the status information on the driver detected by the recurrent network.

As one example, the processor performs a process of inputting the feature map into the detection network, to thereby allow the detection network to (i) generate proposal boxes, corresponding to one or more regions where the object is estimated as located, on the feature map by using a region proposal network, (ii) generate at least one object feature vector by applying pooling operation to each of one or more areas, corresponding to each of the proposal boxes, on the feature map via a pooling layer, and (iii) generate multiple pieces of object information corresponding to the proposal boxes by applying object-detecting fully-connected operation to the object feature vector via an object-detecting fully-connected layer, and as a result, a process of detecting the object located on the visual-dependent driving image.

As one example, the processor performs a process of inputting the feature map into the segmentation network, to thereby allow the segmentation network to generate at least one deconvolutional feature map by applying deconvolution operation to the feature map via at least one deconvolutional layer, and a process of inputting the deconvolutional feature map into at least one lane-detecting fully-connected layer, to thereby allow the lane-detecting fully-connected layer to detect the lanes located on the visual-dependent driving image by applying lane-detecting fully-connected operation to the deconvolutional feature map.

As one example, the processor performs a process of inputting the feature map into the recognition network, to thereby allow the recognition network to (i) generate at least one global feature vector by applying global-pooling operation to the feature map via a global-pooling layer, and (ii) generate driving environment information by applying recognition fully-connected operation to the global feature vector via a recognition fully-connected layer, and as a result, a process of detecting the driving environment corresponding to the visual-dependent driving image.

As one example, the processor performs a process of inputting the acceleration information and the gyroscope information into the recurrent network, to thereby allow the recurrent network to generate the status information on the driver corresponding to behavioral patterns of the driver by applying recurrent operation to one or more change statuses of the acceleration information and the gyroscope information during a preset time period by using one or more Long Short Term Memories (LSTM).

As one example, the processor performs a process of adjusting transparency of lenses of the assistance glasses in response to illumination information acquired from at least one illumination sensor installed on the assistance glasses.

As one example, the output unit includes (i) at least one speaker to be positioned at a location corresponding to at least one ear of the driver if the assistance glasses are worn by the driver and (ii) at least one Virtual Retinal Display (VRD) to be positioned at a location corresponding to at least one eye of the driver if the assistance glasses are worn by the driver.

As one example, the convolution network, the detection network, the segmentation network, and the recognition network have been learned by a 1-st learning device repeating (i) a process of inputting at least one visual-dependent driving image for training into the convolution network, to thereby allow the convolution network to generate at least one feature map for training by applying convolution operation using at least one previously learned convolution parameter to the visual-dependent driving image for training, (ii) (ii-1) a process of inputting the feature map for training into the detection network, to thereby allow (ii-1-1) a region proposal network of the detection network to generate one or more proposal boxes for training, corresponding to one or more regions where at least one object for training is estimated as located, on the feature map for training, (ii-1-2) a pooling layer of the detection network to generate at least one object feature vector for training by applying pooling operation to one or more regions, corresponding to each of the proposal boxes for training, on the feature map for training, and (ii-1-3) an object-detecting fully-connected layer of the detection network to generate multiple pieces of object information for training corresponding to the proposal boxes for training by applying object-detecting fully-connected operation using at least one previously learned object-detection parameter to the object feature vector for training, (ii-2) a process of inputting the feature map for training into the segmentation network, to thereby allow (ii-2-1) a deconvolutional layer of the segmentation network to generate at least one deconvolutional feature map by applying deconvolution operation using at least one previously learned deconvolution parameter to the feature map for training, and (ii-2-2) a lane-detecting fully-connected layer to detect one or more lanes for training located on the visual-dependent driving image for training by applying lane-detecting fully-connected operation using at least one previously learned lane-detection parameter to the deconvolutional feature map, (ii-3) a process of inputting the feature map for training into the recognition network, to thereby allow (ii-3-1) a global-pooling layer of the recognition network to generate at least one global feature vector for training by applying global-pooling operation to the feature map for training, and (ii-3-2) a recognition fully-connected layer of the recognition network to generate driving environment information for training by applying recognition fully-connected operation using at least one previously learned recognition parameter to the global feature vector for training, and (iii) (iii-1) a process of updating the previously learned object-detection parameter of the object-detecting fully-connected layer such that one or more 1-st losses are minimized which are outputted from a 1-st loss layer by referring to the multiple pieces of the object information for training and their corresponding 1-st ground truths, (iii-2) a process of updating at least one of the previously learned lane-detection parameter of the lane-detecting fully-connected layer and the previously learned deconvolution parameter of the deconvolutional layer such that one or more 2-nd losses are minimized which are outputted from a 2-nd loss layer by referring to the lanes for training and their corresponding 2-nd ground truths, (iii-3) a process of updating the previously learned recognition parameter of the recognition fully-connected layer such that one or more 3-rd losses are minimized which are outputted from a 3-rd loss layer by referring to the driving environment information for training and its corresponding 3-rd ground truth, and (iii-4) a process of updating the previously learned convolution parameter of the convolution network such that at least one 4-th loss is minimized which is created by weighted summation of the 1-st losses, the 2-nd losses, and the 3-rd losses or their processed values.

As one example, the recurrent network has been learned by a 2-nd learning device performing a process of inputting acceleration information for training and gyroscope information for training from a current point of time t to a previous point of time (t–k) into each of LSTMs, to thereby allow each of the LSTMs to output driving status information for training corresponding to behavioral patterns of the driver by applying forward operation to the acceleration information for training and the gyroscope information for training from the current point of time t to the previous point of time (t-k), and a process of instructing a 4-th loss layer to adjust one or more parameters of the LSTMs such that one or more 5-th losses are minimized which are created by referring to the driving status information for training and its corresponding 4-th ground truth.

In accordance with still another aspect of the present disclosure, there is provided assistance glasses for providing a driver with safe-driving information, including: the assistance glasses wearable by the driver; one or more sensors, including a camera for taking at least one visual-dependent driving image corresponding to perspective of the driver, an acceleration sensor, and a gyroscope sensor, which are installed on the assistance glasses; and an output unit for providing the driver with the safe-driving information, of the assistance glasses; wherein the assistance glasses includes a safe-driving information analyzing device for performing (I) (I-1) a process of inputting the visual-dependent driving image, acquired from the camera, into a convolution network, to thereby allow the convolution network to generate at least one feature map by applying convolution operation to the visual-dependent driving image, and a process of inputting the feature map respectively into a detection network, a segmentation network, and a recognition network, to thereby allow the detection network to detect at least one object located on the visual-dependent driving image by using the feature map, allow the segmentation network to detect one or more lanes on the visual-dependent driving image, and allow the recognition network to detect driving environment corresponding to the visual-dependent driving image, (I-2) a process of inputting acceleration information acquired from the acceleration sensor and gyroscope information acquired from the gyroscope sensor into a recurrent network, to thereby allow the recurrent network to generate status information on the driver corresponding to the acceleration information and the gyroscope information, and (II) (II-1) a process of notifying the driver of information on an estimated probability of a collision between a vehicle of the driver and the object via the output unit of the assistance glasses by referring to the object detected by the detection network, a process of notifying the driver of lane departure information on the vehicle of the driver via the output unit by referring to the lanes detected by the segmentation network, and a process of notifying the driver of the driving environment detected by the recognition network via the output unit, and (II-2) a process of giving a safe-driving warning to the driver via the output unit by referring to the status information on the driver detected by the recurrent network.

As one example, the sensors further include at least one illumination sensor installed on the assistance glasses, and wherein the safe-driving information analyzing device further performs a process of adjusting transparency of one or more lenses of the assistance glasses in response to illumination information acquired from the illumination sensor.

As one example, the output unit includes (i) at least one speaker to be positioned at a location corresponding to at least one ear of the driver if the assistance glasses are worn by the driver and (ii) at least one Virtual Retinal Display (VRD) to be positioned at a location corresponding to at least one eye of the driver if the assistance glasses are worn by the driver.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
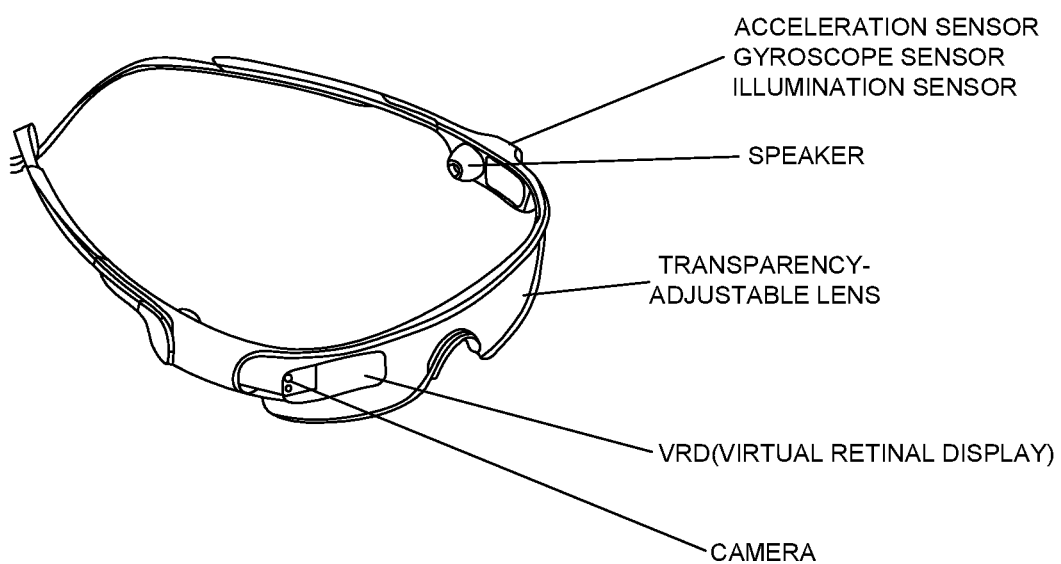
FIG. 1 is a drawing schematically illustrating assistance glasses for autonomous driving in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating assistance glasses in accordance with one example embodiment of the present disclosure, and the assistance glasses may be eyeglasses worn by a driver of a vehicle. Also, at least one camera for detecting at least one visual-dependent driving image corresponding to a perspective of the driver may be mounted on the assistance glasses, and sensors including at least one acceleration sensor, at least one gyroscope sensor, and at least one illumination sensor may also be mounted on the assistance glasses.

And, at least one output unit to be used for outputting and providing safe-driving information to the driver may be installed on the assistance glasses. The output unit may include (i) at least one speaker to be positioned at a location corresponding to at least one ear of the driver, to be used for outputting voice information if the assistance glasses are worn by the driver and (ii) at least one Virtual Retinal Display (VRD) to be positioned at a location corresponding to at least one eye of the driver, to be used for outputting visual information, if the assistance glasses are worn by the driver, but the scope of the present disclosure is not limited thereto.

Also, at least one transparency-adjustable lens may be used for the assistance glasses that can adjust its transparency according to surrounding illumination. Herein, the assistance glasses may have one or more transparency-adjustable lenses.

Also, the assistance glasses may include a safe-driving information analyzing device. The safe-driving information analyzing device uses a neural network, e.g., deep neural network, to analyze the visual-dependent driving image and the sensor information acquired respectively from the camera and the sensors and thus to acquire driving environment information and status information on the driver, to thereby provide the safe-driving information by referring to the acquired driving environment information and the acquired the status information. Herein, the safe-driving information analyzing device may be mounted on the assistance glasses, or may be separated from the assistance glasses but connected with the assistance glasses by wired or wireless communication.

Figure 2:
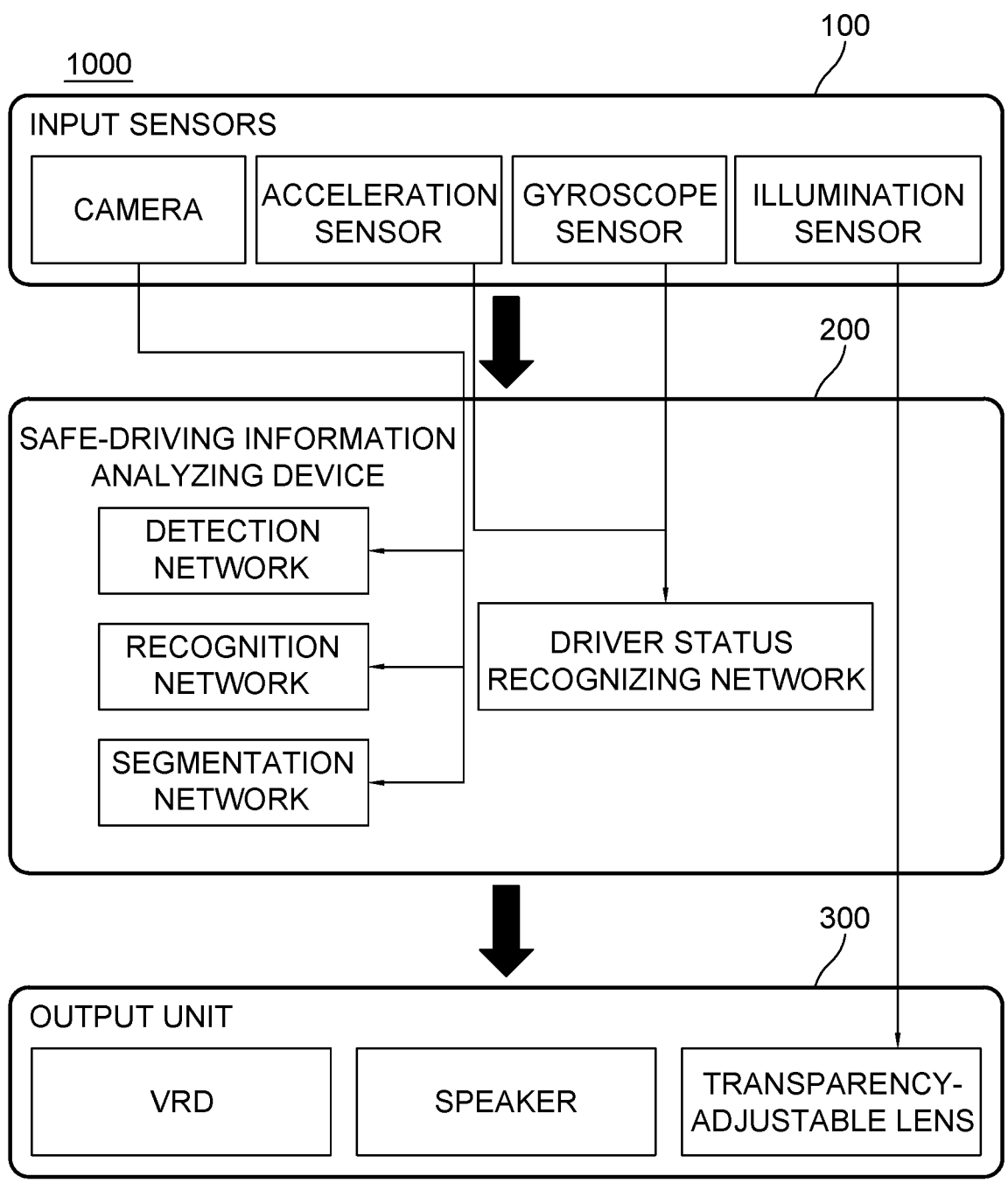
FIG. 2 is a drawing schematically illustrating a block diagram of the assistance glasses for the autonomous driving in accordance with one example embodiment of the present disclosure.

FIG. 2 is a drawing schematically illustrating a block diagram of the assistance glasses in accordance with one example embodiment of the present disclosure, and an autonomous-drive assisting device 1000 may include one or more input sensors 100, the safe-driving information analyzing device 200, and at least one output unit 300.

The input sensors 100 may include sensors, such as the camera, the acceleration sensor, the gyroscope sensor, the illumination sensor, etc., to be used for acquiring driving information. The camera may take the visual-dependent driving image corresponding to the perspective of the driver of the vehicle in operation, the acceleration sensor and the gyroscope sensor may acquire acceleration information and gyroscope information according to behavioral patterns of the driver, and the illumination sensor may acquire illumination in a vicinity of the driver. Herein, the camera may detect the visual-dependent driving image corresponding to the perspective of the driver, and because the visual-dependent driving image may be considered as part of the driving information, the input sensors may include the camera throughout the present disclosure.

The safe-driving information analyzing device 200 may include a detection network to be used for detecting one or more objects, e.g., at least one pedestrian, at least one of other vehicles, etc., by analyzing the visual-dependent driving image, a segmentation network to be used for recognizing one or more lanes by analyzing the visual-dependent driving image, and a recognition network to be used for recognizing weather, time, places, etc. by analyzing the visual-dependent driving image. Herein, each of the networks is described separately, but a single network may be implemented to perform functions of each of the networks.

The output unit 300 may include the VRD for visually displaying the safe-driving information, the speaker for auditorily transmitting the safe-driving information, and the transparency-adjustable lenses capable of adjusting their transparency according to the surrounding illumination. Herein, the transparency-adjustable lenses may adjust their transparency automatically in response to surrounding illumination information acquired from the illumination sensor.

Meanwhile, the safe-driving information analyzing device 200 may input the visual-dependent driving image acquired from the camera into a convolution network, to thereby allow the convolution network to output at least one feature map by applying convolution operation to the visual-dependent driving image, and may input the feature map respectively into the detection network, the segmentation network, and the recognition network. And, the safe-driving information analyzing device 200 may perform (i) a process of allowing the detection network to detect at least one object located on the visual-dependent driving image by using the feature map, (ii) a process of allowing the segmentation network to detect one or more lanes on the visual-dependent driving image, and (iii) a process of allowing the recognition network to detect the driving environment corresponding to the visual-dependent driving image, (iv) a process of inputting the acceleration information acquired from the acceleration sensor and the gyroscope information acquired from the gyroscope sensor into the recurrent network, to thereby allow the recurrent network to generate status information on the driver corresponding to the acceleration information and the gyroscope information. Thereafter, the safe-driving information analyzing device 200 may perform (i) a process of notifying the driver of information on an estimated probability of a collision between the vehicle and the object via the output unit of the assistance glasses by referring to the object detected by the detection network, a process of notifying the driver of lane departure information on the vehicle via the output unit by referring to the lanes detected by the segmentation network, and a process of notifying the driver of the driving environment, via the output unit, detected by the recognition network, and (ii) a process of giving a safe-driving warning to the driver via the output unit by referring to the status information on the driver detected by the recurrent network. Further, the safe-driving information analyzing device 200 may perform a process of adjusting the transparency of the lenses of the assistance glasses in response the illumination information acquired from the illumination sensor installed on the assistance glasses.

Figure 3:
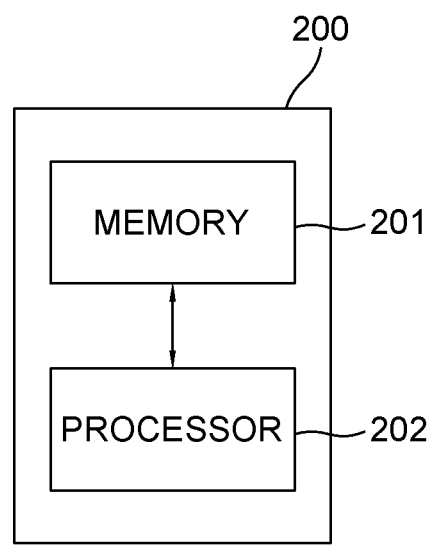
FIG. 3 is a drawing schematically illustrating a safe-driving information analyzing device to be used for providing driver-assisting information by analyzing information acquired from the assistance glasses for the autonomous driving in accordance with one example embodiment of the present disclosure.

FIG. 3 is a drawing schematically illustrating the safe-driving information analyzing device 200 providing the safe-driving information by analyzing information acquired from the assistance glasses in accordance with one example embodiment of the present disclosure. By referring to FIG. 3, the safe-driving information analyzing device 200 may include a memory 201 for storing instructions and a processor 202 for performing processes corresponding to the instructions in the memory 201. The instructions may be, by using the neural network, e.g., a deep neural network, used to analyze the visual-dependent driving image and the sensor information acquired from the camera and the sensors, and thus to acquire the driving environment information and the status information on the driver, to thereby provide the safe-driving information by referring to the acquired driving environment information and the acquired status information. That is, the processor 202 may perform, by using the neural network, a process of analyzing the visual-dependent driving image and the sensor information acquired from the camera and the sensors, and acquiring the driving environment information and the status information, to thereby provide the safe-driving information by referring to the acquired driving environment information and the acquired status information.

Specifically, the safe-driving information analyzing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for analyzing the visual-dependent driving image from the camera by using the neural network and for detecting the driving environment by using the safe-driving information analyzing device 200 in accordance with one example embodiment of the present disclosure is described by referring to FIG. 4 as follows.

First, if the visual-dependent driving image taken from the camera is acquired, the safe-driving information analyzing device 200 may input the visual-dependent driving image into the convolution network 210, to thereby allow the convolution network 210 to apply convolution operation to the visual-dependent driving image, and thus to generate at least one feature map. Herein, the convolution network 210 may include at least one convolutional layer and may apply at least one convolution operation to the visual-dependent driving image.

Next, the safe-driving information analyzing device 200 may input the feature map into the detection network 220, to thereby allow the detection network 220 to detect the objects such as said other vehicles, the pedestrians, etc., on the visual-dependent driving image by using the feature map.

That is, the safe-driving information analyzing device 200 may perform a process of inputting the feature map into the detection network 220, to thereby allow the detection network 220 to (i) generate proposal boxes, corresponding to one or more regions where the object is estimated as located, on the feature map by using a region proposal network 221, (ii) generate at least one object feature vector by applying pooling operation to each of one or more areas, corresponding to each of the proposal boxes, on the feature map via a pooling layer 222, and (iii) generate multiple pieces of object information corresponding to the proposal boxes by applying object-detecting fully-connected operation to the object feature vector via an object-detecting fully-connected layer 223, and as a result, a process of detecting the object located on the visual-dependent driving image.

Herein, the object-detecting fully-connected layer 223 is described as a single layer, but multiple object-detecting fully-connected layers may be used to recognize the pedestrians and said other vehicles among the objects in the visual-dependent driving image. Also, among the objects in the visual-dependent driving image, the pedestrians and said other vehicles are recognized and outputted, but the scope of the present disclosure is not limited thereto.

Also, the safe-driving information analyzing device 200 may input the feature map into the segmentation network 230, to thereby allow the segmentation network 230 to detect the lanes on the visual-dependent driving image.

That is, the safe-driving information analyzing device 200 may perform a process of inputting the feature map into the segmentation network 230, to thereby allow the segmentation network 230 to generate at least one deconvolutional feature map by applying deconvolution operation to the feature map via at least one deconvolutional layer 231, and a process of inputting the deconvolutional feature map into at least one lane-detecting fully-connected layer 232, to thereby allow the lane-detecting fully-connected layer 232 to detect the lanes located on the visual-dependent driving image by applying lane-detecting fully-connected operation to the deconvolutional feature map.

Herein, the lane-detecting fully-connected layer 232 is described as a single layer, but multiple lane-detecting fully-connected layers may be used to detect the lanes in the visual-dependent driving image.

Meanwhile, the lane-detecting fully-connected layer is described above, but at least one 1×1 convolutional layer, not the lane-detecting fully-connected layer, may be used to detect the lanes from the deconvolutional feature map. The present disclosure may use various neural networks or deep neural networks for image segmentation, other than the lane-detecting fully-connected layer and the 1×1 convolutional layer.

Also, the safe-driving information analyzing device 200 may input the feature map into the recognition network 240, to thereby allow the recognition network 240 to detect the driving environment corresponding to the visual-dependent driving image.

That is, the safe-driving information analyzing device 200 may perform a process of inputting the feature map into the recognition network 240, to thereby allow the recognition network 240 to (i) generate at least one global feature vector by applying global-pooling operation to the feature map via a global-pooling layer 241, and (ii) generate the driving environment information by applying recognition fully-connected operation to the global feature vector via a recognition fully-connected layer 242, and as a result, a process of detecting the driving environment, such as weather, time, places, etc., corresponding to the visual-dependent driving image.

Herein, the recognition fully-connected layer 242 is described as a single layer, but multiple recognition fully-connected layers may be used to detect the driving environment corresponding to the visual-dependent driving image.

And, a method for detecting at least one driver status from the sensor information by using the safe-driving information analyzing device 200 in accordance with one example embodiment of the present disclosure is described by referring to FIG. 5 as follows.

On condition that the sensor information of an acceleration X, an acceleration Y, and an acceleration Z from the acceleration sensor, and the sensor information of an angle X, an angle Y, and an angle Z from the gyroscope sensor have been acquired, each piece of the sensor information from a current point of time t to a previous point of time (t−k) is inputted into multiple LSTMs (Long Short-Term Memories) for at least one forward operation, to thereby recognize at least one behavior and at least one situation of the driver, i.e., the driver status, by using the behavioral patterns of the driver corresponding to an acceleration and a position of a head of the driver.

Herein, the driver status may include distraction, sleepiness, DUI, etc., but the scope of the present disclosure is not limited thereto.

Next, a method for providing the safe-driving information by referring to the driving environment and the driver status detected/recognized by the processes above is described.

Figure 4:
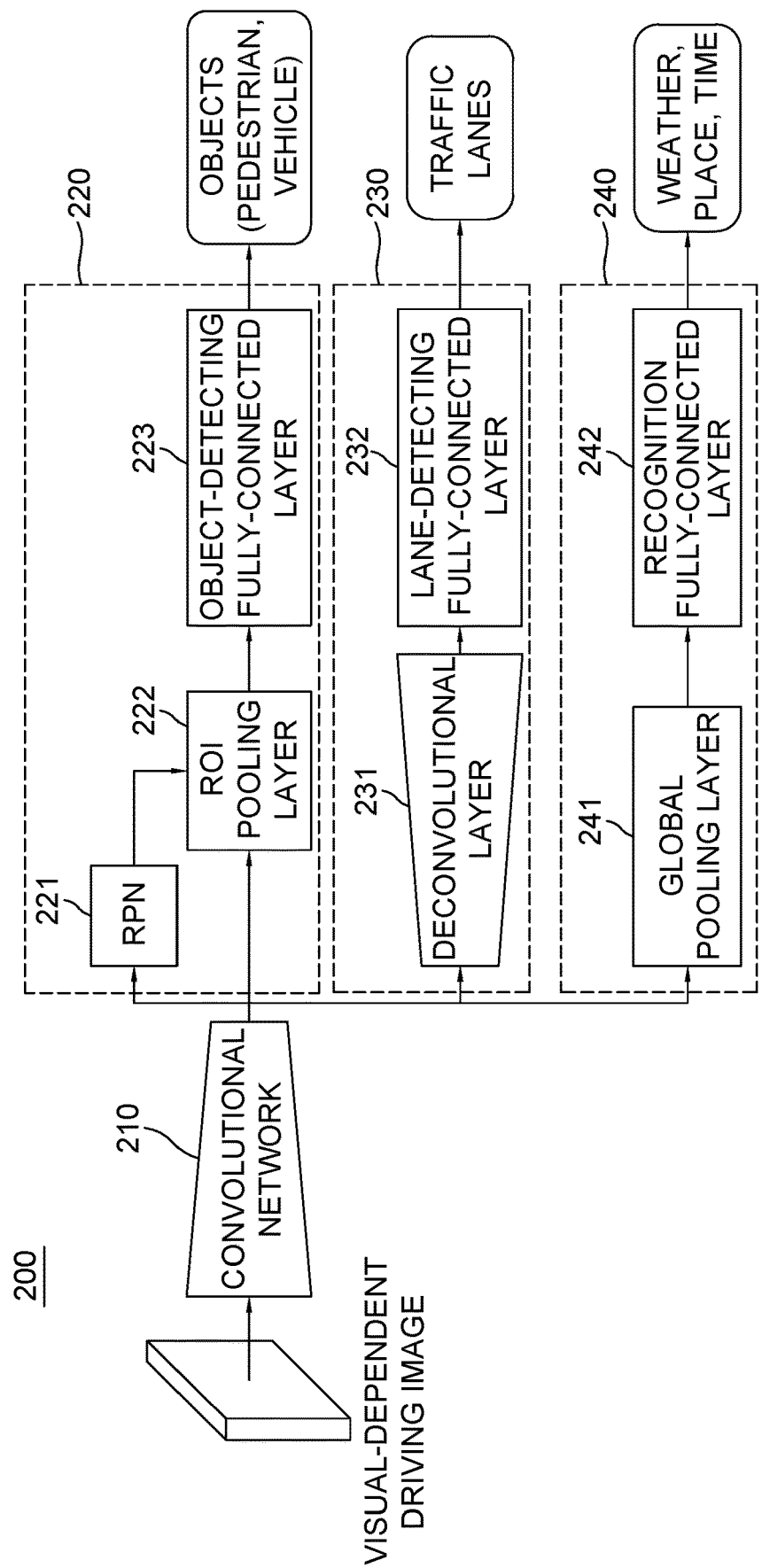
FIG. 4 is a drawing schematically illustrating processes of detecting at least one driving environment by the safe-driving information analyzing device, using at least one visual-dependent driving image, of the assistance glasses for the autonomous driving in accordance with one example embodiment of the present disclosure.
Figure 6:
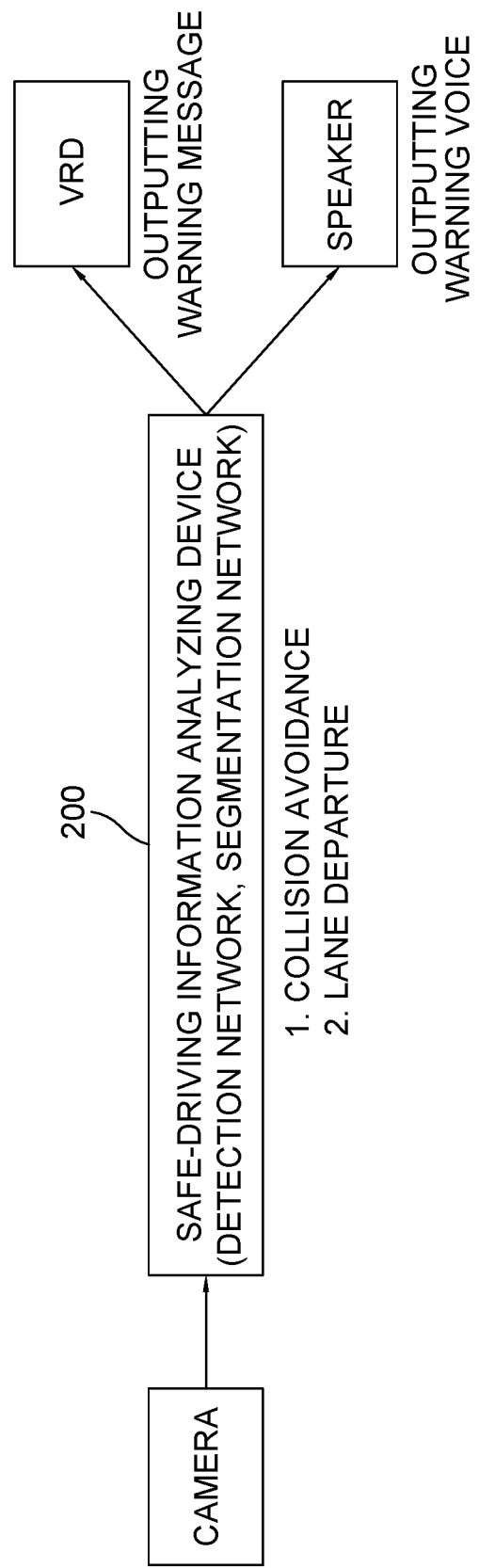
FIG. 6 is a drawing schematically illustrating a process of giving a warning on one or more crashes and one or more lane departures by the safe-driving information analyzing device in the assistance glasses for the autonomous driving in accordance with one example embodiment of the present disclosure.

First, by referring to FIG. 6, on condition that the objects, in the visual-dependent driving image, including the pedestrians and said other vehicles have been detected as per the process in FIG. 4, the safe-driving information analyzing device 200 may determine whether each of the objects is on a collision course with the vehicle of the driver. As one example, by referring to current driving information like a velocity, an angle of a steering wheel, a brake status, etc., it may be determined whether each of the objects detected by an image analysis of the visual-dependent driving image is on the collision course with the vehicle of the driver, if the current driving information is unchanged.

Herein, if any of the objects detected by the image analysis of the visual-dependent driving image is determined as on the collision course, the safe-driving information analyzing device 200 may output a collision warning message via the VRD, or may output collision warning voice via the speaker, to thereby allow the driver to avoid a collision.

And, the safe-driving information analyzing device 200 may determine whether the lanes are in their normal positions by referring to lane information detected from the visual-dependent driving image as per the processes in FIG. 4, that is, whether a traveling direction of the vehicle of the driver does not depart from the lanes but is in the right position.

Herein, if the lanes detected by the image analysis of the visual-dependent driving image is determined as not in their normal positions, that is, if the vehicle is determined as veering out of lane, then the safe-driving information analyzing device 200 may output a lane-departure warning message via the VRD, or may output lane-departure warning voice via the speaker, to thereby allow the driver to prevent a lane-departure.

Figure 7:
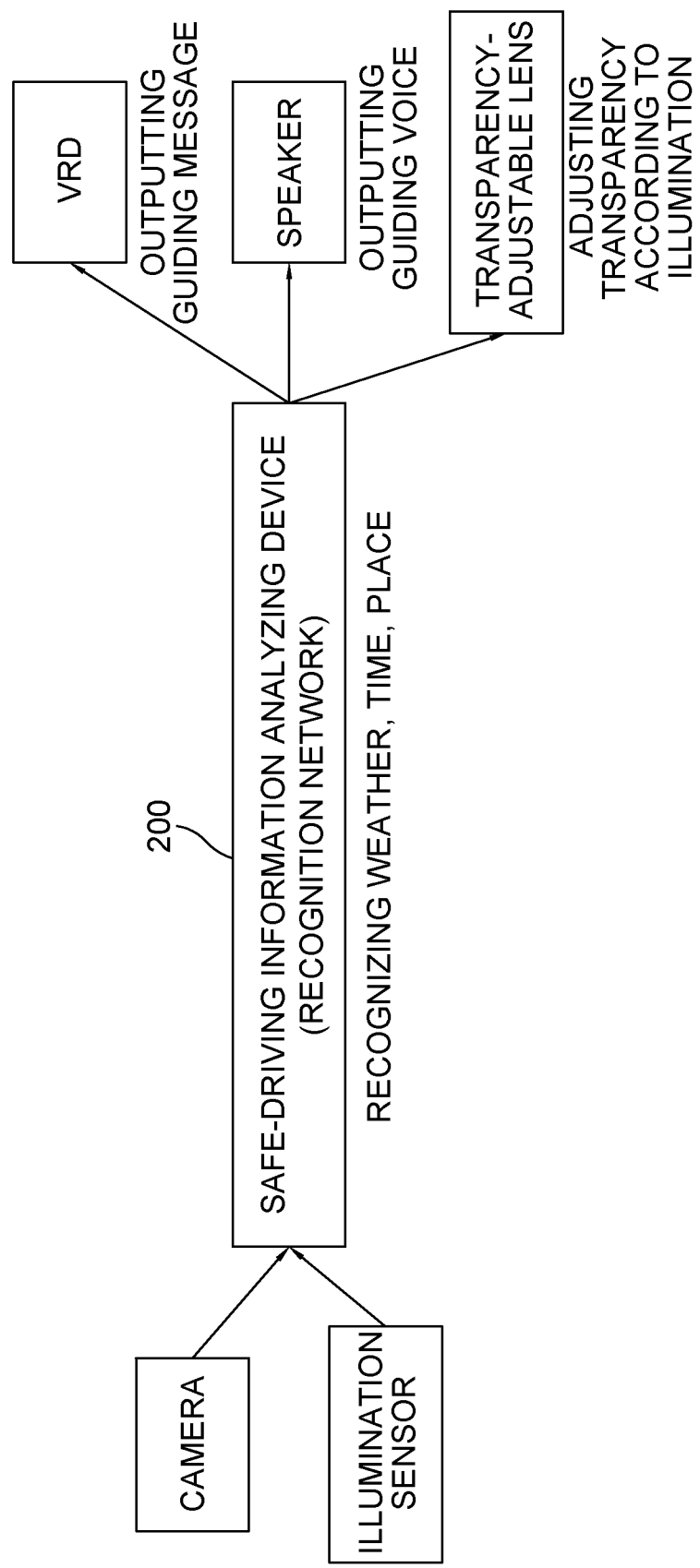
FIG. 7 is a drawing schematically illustrating a process of guiding on at least one driving situation by the safe-driving information analyzing device in the assistance glasses for the autonomous driving in accordance with one example embodiment of the present disclosure.

Next, by referring to FIG. 7, if the driving environment recognized from the visual-dependent driving image is acquired as per the processes in FIG. 4, the safe-driving information analyzing device 200 may output a guiding message corresponding to the driving environment via the VRD, or may output guiding voice corresponding to the driving environment via the speaker, to thereby allow the driver to perceive the driving environment. As one example, the safe-driving information analyzing device 200 may notify the driver of guiding information on safe driving and the driving environment for the driver's convenience, like a tunnel entry, a back light warning, slow speed driving when heavy rain or snow.

Also, the safe-driving information analyzing device 200 may allow the transparency-adjustable lenses of the assistance glasses to adjust their transparency according to the surrounding illumination, to maximize a visual field of the driver according to a degree of illumination of surroundings acquired from the illumination sensor. Herein, the transparency-adjustable lenses may adjust their transparency automatically in response to surrounding illumination information acquired directly from the illumination sensor.

Figure 5:
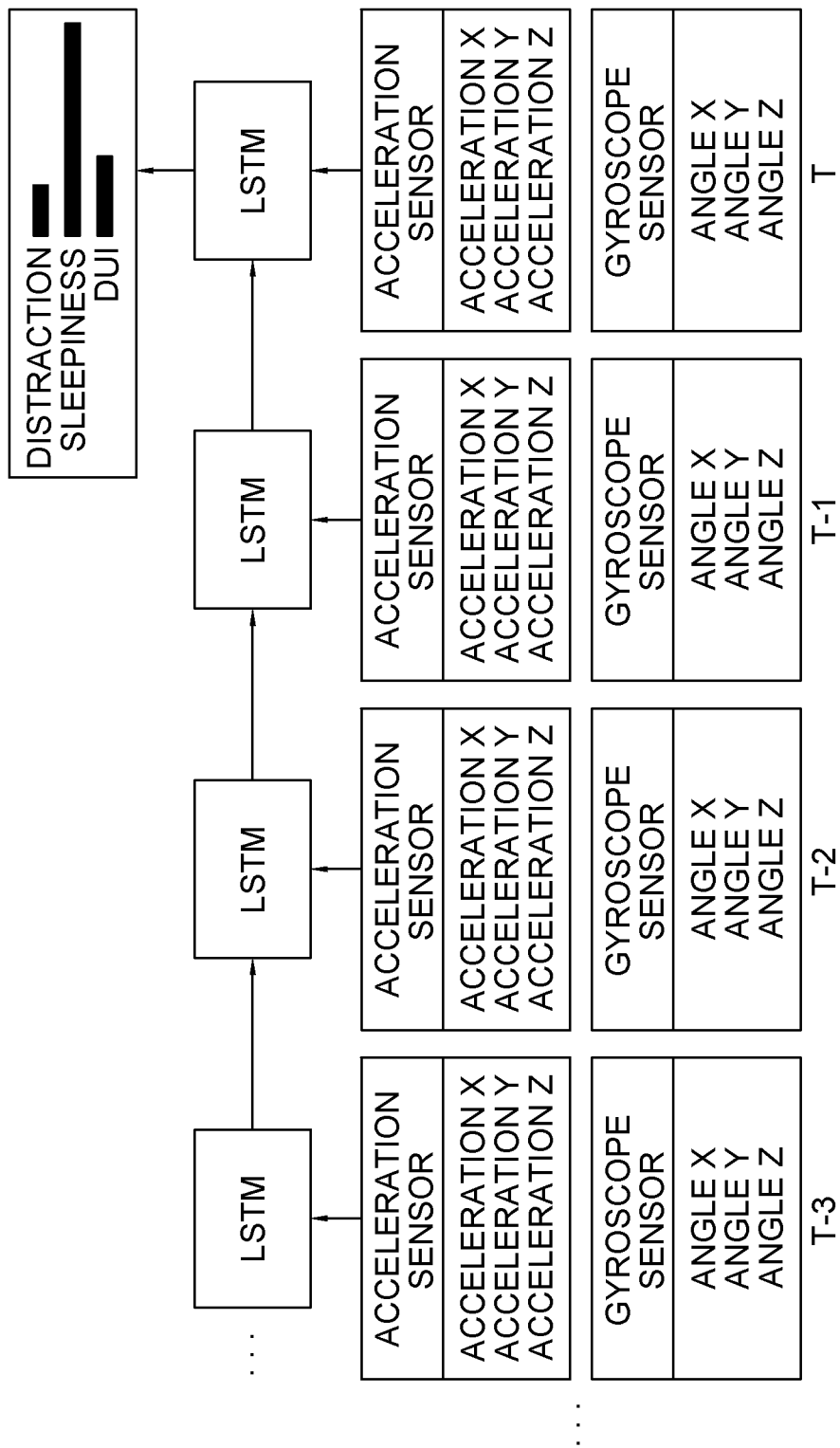
FIG. 5 is a drawing schematically illustrating a process of detecting at least one driver status by the safe-driving information analyzing device, using sensor information, of the assistance glasses for the autonomous driving in accordance with one example embodiment of the present disclosure.
Figure 8:
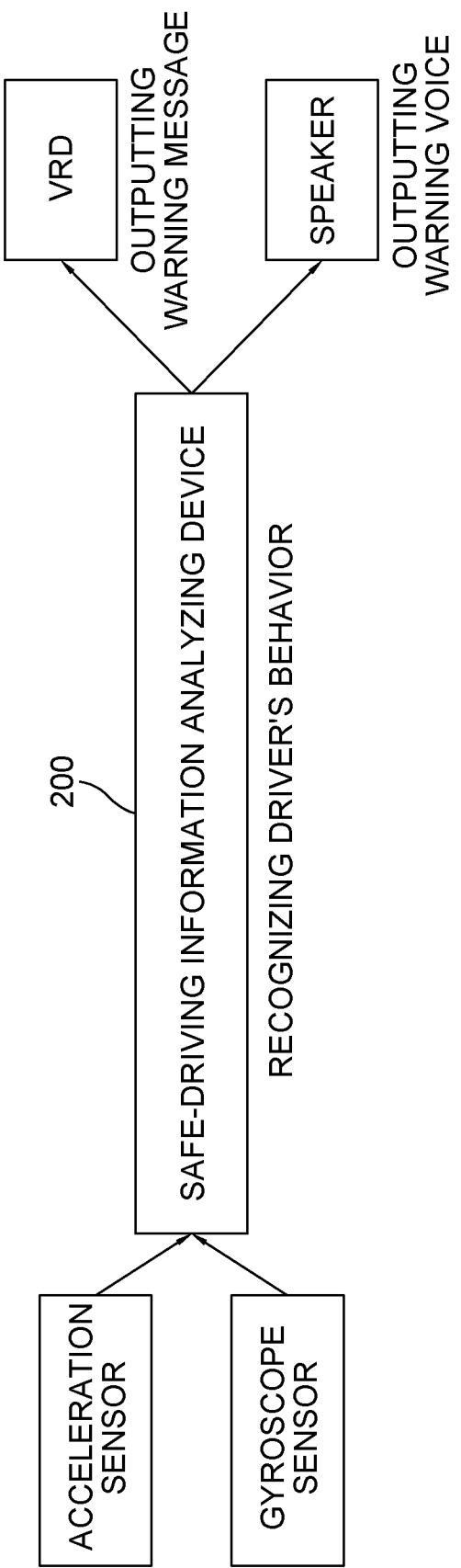
FIG. 8 is a drawing schematically illustrating a process of warning, which urges safe driving, by the safe-driving information analyzing device in the assistance glasses for the autonomous driving in accordance with one example embodiment of the present disclosure.

Next, by referring to FIG. 8, if the driver status analyzed by using the acceleration sensor and the gyroscope sensor is acquired as per the processes in FIG. 5, the safe-driving information analyzing device 200 may allow output of a warning message corresponding to a recognized behavior of the driver via the VRD, or may allow output of warning voice corresponding to the recognized behavior of the driver via the speaker. As one example, if the driver status is determined as the distraction, the driver may be warned so that the driver is forced to look to the front, and if the driver status is determined as the sleepiness or the DUI, a warning related to the sleepiness or the DUI may be given to the driver.

Therefore, the present disclosure analyzes the visual-dependent driving image and the sensor information acquired from the camera and the sensors included in the assistance glasses worn by the driver of the vehicle using the deep neural network, to thereby monitor the driving environment and the driver, warns the driver of dangerous situations by recognizing the dangerous situations corresponding to the monitored driving environment and the monitored driver status, and generates the safe-driving information for the safe driving corresponding to the driving environment and the driver status, to thereby notify the driver using a display or voice.

Meanwhile, the convolution network 210, the detection network 220, the segmentation network 230, and the recognition network 240 of the safe-driving information analyzing device 200 may have been learned in advance by a 1-st learning device.

That is, the 1-st learning device may input a visual-dependent driving image for training into the convolution network 210 and may instruct the convolution network 210 to apply its at least one convolution operation using at least one previously learned convolution parameter to the visual-dependent driving image for training, to thereby generate at least one feature map for training.

And, the 1-st learning device may perform a process of inputting the feature map for training into the detection network 220, to thereby allow (i) the region proposal network 221 of the detection network 220 to generate proposal boxes for training, corresponding to one or more regions where at least one object for training is estimated as located, on the feature map for training, (ii) the pooling layer 222 of the detection network 220 to generate at least one object feature vector for training by applying pooling operation to each of one or more areas, corresponding to each of the proposal boxes for training, on the feature map for training, and (iii) the object-detecting fully-connected layer 223 of the detection network 220 to generate multiple pieces of object information for training corresponding to the proposal boxes for training by applying object-detecting fully-connected operation using at least one previously learned object-detection parameter to the object feature vector for training.

Also, the 1-st learning device may perform a process of inputting the feature map for training into the segmentation network 230, to thereby allow the deconvolutional layer 231 of the segmentation network 230 to generate at least one deconvolutional feature map by applying deconvolution operation using at least one previously learned deconvolution parameter to the feature map for training, and a process of inputting the deconvolutional feature map into the lane-detecting fully-connected layer 232, to thereby allow the lane-detecting fully-connected layer 232 to detect one or more lanes for training located on the visual-dependent driving image for training by applying lane-detecting fully-connected operation using at least one previously learned lane-detection parameter to the deconvolutional feature map.

Also, the 1-st learning device may perform a process of inputting the feature map for training into the recognition network 240, to thereby allow (i) the global-pooling layer 241 of the recognition network 240 to generate at least one global feature vector for training, by applying global-pooling operation to the feature map for training, (ii) the recognition fully-connected layer 242 of the recognition network 240 to generate driving environment information for training by applying recognition fully-connected operation using at least one previously learned recognition parameter to the global feature vector for training.

Thereafter, the 1-st learning device may perform the learning by repeating (i) a process of updating the previously learned object-detection parameter of the object-detecting fully-connected layer 223 such that one or more 1-st losses are minimized which are outputted from a 1-st loss layer by referring to the multiple pieces of the object information for training and their corresponding 1-st ground truths, (ii) a process of updating at least one of the previously learned lane-detection parameter of the lane-detecting fully-connected layer 232 and the previously learned deconvolution parameter of the deconvolutional layer 231 such that one or more 2-nd losses are minimized which are outputted from a 2-nd loss layer by referring to the lanes for training and their corresponding 2-nd ground truths, (iii) a process of updating the previously learned recognition parameter of the recognition fully-connected layer such that one or more 3-rd losses are minimized which are outputted from a 3-rd loss layer by referring to the driving environment information for training and its corresponding 3-rd ground truth, and (iv) a process of updating the previously learned convolution parameter of the convolution network such that at least one 4-th loss is minimized which is created by weighted summation of the 1-st losses, the 2-nd losses, and the 3-rd losses or their processed values.

Herein, the 4-th loss may be a weighted summation of at least one 1-st processed value which is backwarded to the convolution network 210 by backpropagation using the 1-st losses, at least one 2-nd processed value which is backwarded to the convolution network 210 by backpropagation using the 2-nd losses, and at least one 3-rd processed value which is backwarded to the convolution network 210 by backpropagation using the 3-rd losses.

Also, the recurrent network may have been learned by a 2-nd learning device performing a process of inputting acceleration information for training and gyroscope information for training from a current point of time t to a previous point of time (t−k) into each of the LSTMs, to thereby allow each of the LSTMs to output driving status information for training corresponding to behavioral patterns of the driver by applying forward operation to the acceleration information for training and the gyroscope information for training from the current point of time t to the previous point of time (t−k), and a process of instructing a 4-th loss layer to adjust one or more parameters of the LSTMs such that one or more 5-th losses are minimized which are created by referring to the driving status information for training and its corresponding 4-th ground truth.

Herein, the 1-st learning device and the 2-nd learning device may be implemented as multiple systems or a single system.

The present disclosure has an effect of reducing a manufacturing cost, compared to conventional methods, by recognizing the driver status and the driving environment using the neural network with the driving image and the sensor information respectively acquired from the camera and the sensors included in the assistance glasses.

The present disclosure has another effect of allowing surrounding monitoring, driver monitoring, and hazardous situation recognition by the neural network using the driving image and the sensor information respectively acquired from the camera and the sensors included in the assistance glasses.

The present disclosure has still another effect of notifying the driver of the driver-assisting information acquired by the neural network using the driving image and the sensor information.

The present disclosure has still yet another effect of reducing time and cost of installing an ADAS, by implementing the ADAS using the assistance glasses wearable by the driver, compared to the conventional methods of installing the sensors and the cameras on the vehicle.

The present disclosure has still yet another effect of providing the driving information optimized for the driver by implementing the ADAS using the assistance glasses worn by the driver.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing safe-driving information via assistance glasses worn by a driver, comprising steps of:
(a) if at least one visual-dependent driving image corresponding to perspective of the driver taken from at least one camera installed on the assistance glasses worn by the driver of a vehicle, acceleration information and gyroscope information from one or more sensors installed on the assistance glasses are acquired, a safe-driving information analyzing device performing (i) a process of inputting the visual-dependent driving image into a convolution network, to thereby allow the convolution network to generate at least one feature map by applying convolution operation to the visual-dependent driving image, and a process of inputting the feature map respectively into a detection network, a segmentation network, and a recognition network, to thereby allow the detection network to detect at least one object located on the visual-dependent driving image by using the feature map, allow the segmentation network to detect one or more lanes on the visual-dependent driving image, and allow the recognition network to detect driving environment corresponding to the visual-dependent driving image, (ii) a process of inputting the acceleration information and the gyroscope information into a recurrent network, to thereby allow the recurrent network to generate status information on the driver corresponding to the acceleration information and the gyroscope information; and
(b) the safe-driving information analyzing device performing (i) a process of notifying the driver of information on an estimated probability of a collision between the vehicle and the object via an output unit of the assistance glasses by referring to the object detected by the detection network, a process of notifying the driver of lane departure information on the vehicle via the output unit by referring to the lanes detected by the segmentation network, and a process of notifying the driver of the driving environment detected by the recognition network via the output unit, and (ii) a process of giving a safe-driving warning to the driver via the output unit by referring to the status information on the driver detected by the recurrent network.

2. The method of claim 1, wherein the safe-driving information analyzing device performs a process of inputting the feature map into the detection network, to thereby allow the detection network to (i) generate proposal boxes, corresponding to one or more regions where the object is estimated as located, on the feature map by using a region proposal network, (ii) generate at least one object feature vector by applying pooling operation to each of one or more areas, corresponding to each of the proposal boxes, on the feature map via a pooling layer, and (iii) generate multiple pieces of object information corresponding to the proposal boxes by applying object-detecting fully-connected operation to the object feature vector via an object-detecting fully-connected layer, and as a result, a process of detecting the object located on the visual-dependent driving image.

3. The method of claim 1, wherein the safe-driving information analyzing device performs a process of inputting the feature map into the segmentation network, to thereby allow the segmentation network to generate at least one deconvolutional feature map by applying deconvolution operation to the feature map via at least one deconvolutional layer, and a process of inputting the deconvolutional feature map into at least one lane-detecting fully-connected layer, to thereby allow the lane-detecting fully-connected layer to detect the lanes located on the visual-dependent driving image by applying lane-detecting fully-connected operation to the deconvolutional feature map.

4. The method of claim 1, wherein the safe-driving information analyzing device performs a process of inputting the feature map into the recognition network, to thereby allow the recognition network to (i) generate at least one global feature vector by applying global-pooling operation to the feature map via a global-pooling layer, and (ii)

generate driving environment information by applying recognition fully-connected operation to the global feature vector via a recognition fully-connected layer, and as a result, a process of detecting the driving environment corresponding to the visual-dependent driving image.

5. The method of claim 1, wherein the safe-driving information analyzing device performs a process of inputting the acceleration information and the gyroscope information into the recurrent network, to thereby allow the recurrent network to generate the status information on the driver corresponding to behavioral patterns of the driver by applying recurrent operation to one or more change statuses of the acceleration information and the gyroscope information during a preset time period by using one or more Long Short Term Memories (LSTM).

6. The method of claim 1, wherein the safe-driving information analyzing device performs a process of adjusting transparency of lenses of the assistance glasses in response to illumination information acquired from at least one illumination sensor installed on the assistance glasses.

7. The method of claim 1, wherein the output unit includes (i) at least one speaker to be positioned at a location corresponding to at least one ear of the driver if the assistance glasses are worn by the driver and (ii) at least one Virtual Retinal Display (VRD) to be positioned at a location corresponding to at least one eye of the driver if the assistance glasses are worn by the driver.

8. The method of claim 1, wherein the convolution network, the detection network, the segmentation network, and the recognition network have been learned by a 1-st learning device repeating (i) a process of inputting at least one visual-dependent driving image for training into the convolution network, to thereby allow the convolution network to generate at least one feature map for training by applying convolution operation using at least one previously learned convolution parameter to the visual-dependent driving image for training, (ii) (ii-1) a process of inputting the feature map for training into the detection network, to thereby allow (ii-1-1) a region proposal network of the detection network to generate one or more proposal boxes for training, corresponding to one or more regions where at least one object for training is estimated as located, on the feature map for training, (ii-1-2) a pooling layer of the detection network to generate at least one object feature vector for training by applying pooling operation to one or more regions, corresponding to each of the proposal boxes for training, on the feature map for training, and (ii-1-3) an object-detecting fully-connected layer of the detection network to generate multiple pieces of object information for training corresponding to the proposal boxes for training by applying object-detecting fully-connected operation using at least one previously learned object-detection parameter to the object feature vector for training, (ii-2) a process of inputting the feature map for training into the segmentation network, to thereby allow (ii-2-1) a deconvolutional layer of the segmentation network to generate at least one deconvolutional feature map by applying deconvolution operation using at least one previously learned deconvolution parameter to the feature map for training, and (ii-2-2) a lane-detecting fully-connected layer to detect one or more lanes for training located on the visual-dependent driving image for training by applying lane-detecting fully-connected operation using at least one previously learned lane-detection parameter to the deconvolutional feature map, (ii-3) a process of inputting the feature map for training into the recognition network, to thereby allow (ii-3-1) a global-pooling layer of the recognition network to generate at least one global feature vector for training by applying global-pooling operation to the feature map for training, and (ii-3-2) a recognition fully-connected layer of the recognition network to generate driving environment information for training by applying recognition fully-connected operation using at least one previously learned recognition parameter to the global feature vector for training, and (iii) (iii-1) a process of updating the previously learned object-detection parameter of the object-detecting fully-connected layer such that one or more 1-st losses are minimized which are outputted from a 1-st loss layer by referring to the multiple pieces of the object information for training and their corresponding 1-st ground truths, (iii-2) a process of updating at least one of the previously learned lane-detection parameter of the lane-detecting fully-connected layer and the previously learned deconvolution parameter of the deconvolutional layer such that one or more 2-nd losses are minimized which are outputted from a 2-nd loss layer by referring to the lanes for training and their corresponding 2-nd ground truths, (iii-3) a process of updating the previously learned recognition parameter of the recognition fully-connected layer such that one or more 3-rd losses are minimized which are outputted from a 3-rd loss layer by referring to the driving environment information for training and its corresponding 3-rd ground truth, and (iii-4) a process of updating the previously learned convolution parameter of the convolution network such that at least one 4-th loss is minimized which is created by weighted summation of the 1-st losses, the 2-nd losses, and the 3-rd losses or their processed values.

9. The method of claim 1, wherein the recurrent network has been learned by a 2-nd learning device performing a process of inputting acceleration information for training and gyroscope information for training from a current point of time t to a previous point of time (t–k) into each of LSTMs, to thereby allow each of the LSTMs to output driving status information for training corresponding to behavioral patterns of the driver by applying forward operation to the acceleration information for training and the gyroscope information for training from the current point of time t to the previous point of time (t-k), and a process of instructing a 4-th loss layer to adjust one or more parameters of the LSTMs such that one or more 5-th losses are minimized which are created by referring to the driving status information for training and its corresponding 4-th ground truth.

10. A safe-driving information analyzing device for providing safe-driving information via assistance glasses worn by a driver, comprising:
  at least one memory that stores instructions; and
  at least one processor configured to execute the instructions to perform or support another device to perform: (I) if at least one visual-dependent driving image corresponding to perspective of the driver taken from at least one camera installed on the assistance glasses worn by the driver of a vehicle, acceleration information and gyroscope information from one or more sensors installed on the assistance glasses are acquired, (I-1) a process of inputting the visual-dependent driving image into a convolution network, to thereby allow the convolution network to generate at least one feature map by applying convolution operation to the visual-dependent driving image, and a process of inputting the feature map respectively into a detection network, a segmentation network, and a recognition network, to thereby allow the detection network to detect at least one object located on the visual-dependent driving image by using the feature map, allow the segmentation network to detect one or more lanes on the visual-dependent driving image, and allow the recognition network to detect driving environment corresponding to the visual-dependent driving image, (I-2) a process of inputting the acceleration information and the gyroscope information into a recurrent network, to thereby allow the recurrent network to generate status information on the driver corresponding to the acceleration information and the gyroscope information, and (II) (II-1) a process of notifying the driver of information on an estimated probability of a collision between the vehicle and the object via an output unit of the assistance glasses by referring to the object detected by the detection network, a process of notifying the driver of lane departure information on the vehicle via the output unit by referring to the lanes detected by the segmentation network, and a process of notifying the driver of the driving environment detected by the recognition network via the output unit, and (II-2) a process of giving a safe-driving warning to the driver via the output unit by referring to the status information on the driver detected by the recurrent network.

11. The safe-driving information analyzing device of claim 10, wherein the processor performs a process of inputting the feature map into the detection network, to thereby allow the detection network to (i) generate proposal boxes, corresponding to one or more regions where the object is estimated as located, on the feature map by using a region proposal network, (ii) generate at least one object feature vector by applying pooling operation to each of one or more areas, corresponding to each of the proposal boxes, on the feature map via a pooling layer, and (iii) generate multiple pieces of object information corresponding to the proposal boxes by applying object-detecting fully-connected operation to the object feature vector via an object-detecting fully-connected layer, and as a result, a process of detecting the object located on the visual-dependent driving image.

12. The safe-driving information analyzing device of claim 10, wherein the processor performs a process of inputting the feature map into the segmentation network, to thereby allow the segmentation network to generate at least one deconvolutional feature map by applying deconvolution operation to the feature map via at least one deconvolutional layer, and a process of inputting the deconvolutional feature map into at least one lane-detecting fully-connected layer, to thereby allow the lane-detecting fully-connected layer to detect the lanes located on the visual-dependent driving image by applying lane-detecting fully-connected operation to the deconvolutional feature map.

13. The safe-driving information analyzing device of claim 10, wherein the processor performs a process of inputting the feature map into the recognition network, to thereby allow the recognition network to (i) generate at least one global feature vector by applying global-pooling operation to the feature map via a global-pooling layer, and (ii) generate driving environment information by applying recognition fully-connected operation to the global feature vector via a recognition fully-connected layer, and as a result, a process of detecting the driving environment corresponding to the visual-dependent driving image.

14. The safe-driving information analyzing device of claim 10, wherein the processor performs a process of inputting the acceleration information and the gyroscope information into the recurrent network, to thereby allow the recurrent network to generate the status information on the driver corresponding to behavioral patterns of the driver by applying recurrent operation to one or more change statuses of the acceleration information and the gyroscope information during a preset time period by using one or more Long Short Term Memories (LSTM).

15. The safe-driving information analyzing device of claim 10, wherein the processor performs a process of adjusting transparency of lenses of the assistance glasses in response to illumination information acquired from at least one illumination sensor installed on the assistance glasses.

16. The safe-driving information analyzing device of claim 10, wherein the output unit includes (i) at least one speaker to be positioned at a location corresponding to at least one ear of the driver if the assistance glasses are worn by the driver and (ii) at least one Virtual Retinal Display (VRD) to be positioned at a location corresponding to at least one eye of the driver if the assistance glasses are worn by the driver.

17. The safe-driving information analyzing device of claim 10, wherein the convolution network, the detection network, the segmentation network, and the recognition network have been learned by a 1-st learning device repeating (i) a process of inputting at least one visual-dependent driving image for training into the convolution network, to thereby allow the convolution network to generate at least one feature map for training by applying convolution operation using at least one previously learned convolution parameter to the visual-dependent driving image for training, (ii) (ii-1) a process of inputting the feature map for training into the detection network, to thereby allow (ii-1-1) a region proposal network of the detection network to generate one or more proposal boxes for training, corresponding to one or more regions where at least one object for training is estimated as located, on the feature map for training, (ii-1-2) a pooling layer of the detection network to generate at least one object feature vector for training by applying pooling operation to one or more regions, corresponding to each of the proposal boxes for training, on the feature map for training, and (ii-1-3) an object-detecting fully-connected layer of the detection network to generate multiple pieces of object information for training corresponding to the proposal boxes for training by applying object-detecting fully-connected operation using at least one previously learned object-detection parameter to the object feature vector for training, (ii-2) a process of inputting the feature map for training into the segmentation network, to thereby allow (ii-2-1) a deconvolutional layer of the segmentation network to generate at least one deconvolutional feature map by applying deconvolution operation using at least one previously learned deconvolution parameter to the feature map for training, and (ii-2-2) a lane-detecting fully-connected layer to detect one or more lanes for training located on the visual-dependent driving image for training by applying lane-detecting fully-connected operation using at least one previously learned lane-detection parameter to the deconvolutional feature map, (ii-3) a process of inputting the feature map for training into the recognition network, to thereby allow (ii-3-1) a global-pooling layer of the recognition network to generate at least one global feature vector for training by applying global-pooling operation to the feature map for training, and (ii-3-2) a recognition fully-connected layer of the recognition network to generate driving environment information for training by applying recognition fully-connected operation using at least one previously learned recognition parameter to the global feature vector for training, and (iii) (iii-1) a process of updating the previously learned object-detection parameter of the object-detecting fully-connected layer such that one or more 1-st losses are minimized which are outputted from a 1-st loss layer by referring to the multiple pieces of the object information for training and their corresponding 1-st ground truths, (iii-2) a process of updating at least one of the previously learned lane-detection parameter of the lane-detecting fully-connected layer and the previously learned deconvolution parameter of the deconvolutional layer such that one or more 2-nd losses are minimized which are outputted from a 2-nd loss layer by referring to the lanes for training and their corresponding 2-nd ground truths, (iii-3) a process of updating the previously learned recognition parameter of the recognition fully-connected layer such that one or more 3-rd losses are minimized which are outputted from a 3-rd loss layer by referring to the driving environment information for training and its corresponding 3-rd ground truth, and (iii-4) a process of updating the previously learned convolution parameter of the convolution network such that at least one 4-th loss is minimized which is created by weighted summation of the 1-st losses, the 2-nd losses, and the 3-rd losses or their processed values.

18. The safe-driving information analyzing device of claim 10, wherein the recurrent network has been learned by a 2-nd learning device performing a process of inputting acceleration information for training and gyroscope information for training from a current point of time t to a previous point of time (t-k) into each of LSTMs, to thereby allow each of the LSTMs to output driving status information for training corresponding to behavioral patterns of the driver by applying forward operation to the acceleration information for training and the gyroscope information for training from the current point of time t to the previous point of time (t–k), and a process of instructing a 4-th loss layer to adjust one or more parameters of the LSTMs such that one or more 5-th losses are minimized which are created by referring to the driving status information for training and its corresponding 4-th ground truth.

19. Assistance glasses for providing a driver with safe-driving information, comprising:
the assistance glasses wearable by the driver;
one or more sensors, including a camera for taking at least one visual-dependent driving image corresponding to perspective of the driver, an acceleration sensor, and a gyroscope sensor, which are installed on the assistance glasses; and
an output unit for providing the driver with the safe-driving information, of the assistance glasses;
wherein the assistance glasses includes a safe-driving information analyzing device for performing (I) (I-1) a process of inputting the visual-dependent driving image, acquired from the camera, into a convolution network, to thereby allow the convolution network to generate at least one feature map by applying convolution operation to the visual-dependent driving image, and a process of inputting the feature map respectively into a detection network, a segmentation network, and a recognition network, to thereby allow the detection network to detect at least one object located on the visual-dependent driving image by using the feature map, allow the segmentation network to detect one or more lanes on the visual-dependent driving image, and allow the recognition network to detect driving environment corresponding to the visual-dependent driving image, (I-2) a process of inputting acceleration information acquired from the acceleration sensor and gyroscope information acquired from the gyroscope sensor into a recurrent network, to thereby allow the recurrent network to generate status information on the driver corresponding to the acceleration information and the gyroscope information, and (II) (II-1) a process of notifying the driver of information on an estimated probability of a collision between a vehicle of the driver and the object via the output unit of the assistance glasses by referring to the object detected by the detection network, a process of notifying the driver of lane departure information on the vehicle of the driver via the output unit by referring to the lanes detected by the segmentation network, and a process of notifying the driver of the driving environment detected by the recognition network via the output unit, and (II-2) a process of giving a safe-driving warning to the driver via the output unit by referring to the status information on the driver detected by the recurrent network.

20. The assistance glasses of claim 19, wherein the sensors further include at least one illumination sensor installed on the assistance glasses, and
wherein the safe-driving information analyzing device further performs a process of adjusting transparency of one or more lenses of the assistance glasses in response to illumination information acquired from the illumination sensor.

21. The assistance glasses of claim 19, wherein the output unit includes (i) at least one speaker to be positioned at a location corresponding to at least one ear of the driver if the assistance glasses are worn by the driver and (ii) at least one Virtual Retinal Display (VRD) to be positioned at a location corresponding to at least one eye of the driver if the assistance glasses are worn by the driver.

* * * * *